United States Patent
Kim et al.

(10) Patent No.: US 11,687,270 B2
(45) Date of Patent: Jun. 27, 2023

(54) STORAGE DEVICE AND OPERATING METHOD PERFORMING GARBAGE COLLECTION OF CYCLICAL DATA

(71) Applicant: SK hynix Inc., Icheon-si (KR)

(72) Inventors: Tae Ha Kim, Icheon-si (KR); Hyo Jin Choi, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 124 days.

(21) Appl. No.: 17/313,936

(22) Filed: May 6, 2021

(65) Prior Publication Data
US 2022/0137851 A1 May 5, 2022

(30) Foreign Application Priority Data

Nov. 4, 2020 (KR) .................. 10-2020-0146324

(51) Int. Cl.
*G06F 3/06* (2006.01)
*H04L 9/32* (2006.01)

(52) U.S. Cl.
CPC ............ *G06F 3/0652* (2013.01); *G06F 3/064* (2013.01); *G06F 3/0608* (2013.01); *G06F 3/0673* (2013.01); *H04L 9/32* (2013.01)

(58) Field of Classification Search
CPC ...... G06F 3/0652; G06F 3/0608; G06F 3/064; G06F 3/0673; G06F 2212/7205; G06F 3/0679; G06F 12/0246; G06F 12/0253; G06F 3/0604; G06F 3/0658; G06F 12/1408; H04L 9/32; G11C 16/16; G11C 16/14

See application file for complete search history.

(56) References Cited

U.S. PATENT DOCUMENTS

| | | | | |
|---|---|---|---|---|
| 7,610,437 B2* | 10/2009 | Sinclair | ................. | G06F 3/0652 711/104 |
| 7,984,084 B2* | 7/2011 | Sinclair | ............... | G06F 16/1847 707/818 |
| 8,285,918 B2* | 10/2012 | Maheshwari | ........ | G11C 7/1072 711/159 |

(Continued)

FOREIGN PATENT DOCUMENTS

| | | | |
|---|---|---|---|
| KR | 20150118778 A | 10/2015 | |
| KR | 20200067035 A | 6/2020 | |

OTHER PUBLICATIONS

Wang et al., "A data processing method, device, apparatus, and readable storage medium", Feb. 7, 2020, pp. 1-9, CN-110764714-A (Year: 2020).*

*Primary Examiner* — Christopher D Birkhimer
(74) *Attorney, Agent, or Firm* — Perkins Coie LLP

(57) ABSTRACT

A storage device includes: a memory device including a plurality of system blocks for storing system data; and a memory controller configured to control the memory device to store cyclic system data that is cyclically provided from a host, in an open system block among the plurality of system blocks, and control the memory device to perform a garbage collection operation on the plurality of system blocks, when a size of data stored in the open system block reaches a predetermined size. The cyclic system data may include a plurality of data slices provided from the host at predetermined cycles. The predetermined size may be determined based on size of the cyclic system data provided for a period of time corresponding to a common multiple of the predetermined cycles.

20 Claims, 11 Drawing Sheets

(56) References Cited

U.S. PATENT DOCUMENTS

| | | | | |
|---|---|---|---|---|
| 8,443,263 B2* | 5/2013 | Selinger | ............... | G06F 11/1068 |
| | | | | 714/768 |
| 8,873,284 B2* | 10/2014 | Sinclair | ............... | G06F 12/0246 |
| | | | | 365/185.11 |
| 9,223,693 B2* | 12/2015 | Sinclair | ............... | G06F 12/0246 |
| 9,336,133 B2* | 5/2016 | Sinclair | ............... | G06F 12/0246 |
| 9,348,746 B2* | 5/2016 | Sinclair | ............... | G06F 12/0246 |
| 9,465,731 B2* | 10/2016 | Sinclair | ............... | G06F 12/0246 |
| 9,734,050 B2* | 8/2017 | Sinclair | ............... | G06F 12/0253 |
| 9,734,911 B2* | 8/2017 | Sinclair | ................ | G06F 3/0658 |
| 9,778,855 B2* | 10/2017 | Sinclair | ................... | G06F 3/064 |
| 10,108,543 B1* | 10/2018 | Duggal | ................. | G06F 3/0619 |
| 10,108,544 B1* | 10/2018 | Duggal | ................. | G06F 16/1748 |
| 10,120,613 B2* | 11/2018 | Sinclair | ................... | G06F 12/02 |
| 10,133,490 B2* | 11/2018 | Sinclair | ................... | G06F 3/0655 |
| 10,255,179 B2* | 4/2019 | Ji | ......................... | G06F 3/0659 |
| 10,430,279 B1* | 10/2019 | Dittia | .................... | G06F 3/0656 |
| 10,795,812 B1* | 10/2020 | Duggal | ................... | G06F 3/067 |
| 10,983,715 B2* | 4/2021 | Sharoni | ................ | G06Q 20/105 |
| 11,086,537 B2* | 8/2021 | Byun | .................... | G06F 3/0679 |
| 2007/0033325 A1* | 2/2007 | Sinclair | ................. | G06F 3/0608 |
| | | | | 711/170 |
| 2008/0082596 A1* | 4/2008 | Gorobets | ............ | G06F 12/0253 |
| 2008/0189477 A1* | 8/2008 | Asano | ................. | G06F 12/0246 |
| | | | | 711/E12.008 |
| 2011/0145473 A1* | 6/2011 | Maheshwari | ........... | G06F 12/12 |
| | | | | 711/E12.008 |
| 2011/0161784 A1* | 6/2011 | Selinger | ............. | G06F 11/1016 |
| | | | | 714/E11.002 |
| 2014/0325148 A1* | 10/2014 | Choi | .................... | G06F 3/0659 |
| | | | | 711/114 |
| 2014/0365719 A1* | 12/2014 | Kuzmin | ............. | G06F 12/0246 |
| | | | | 711/103 |
| 2015/0227602 A1* | 8/2015 | Ram | .................. | G06F 11/1456 |
| | | | | 707/634 |
| 2016/0246713 A1* | 8/2016 | Choi | .................... | G06F 3/0608 |
| 2017/0123655 A1* | 5/2017 | Sinclair | ................. | G06F 3/061 |
| 2018/0189175 A1* | 7/2018 | Ji | ....................... | G06F 3/0679 |
| 2020/0089420 A1* | 3/2020 | Sharoni | ................ | G06Q 20/354 |
| 2020/0310686 A1* | 10/2020 | Truong | ................ | G06F 3/061 |

* cited by examiner

STORAGE DEVICE AND OPERATING METHOD PERFORMING GARBAGE COLLECTION OF CYCLICAL DATA

CROSS-REFERENCE TO RELATED APPLICATION

This patent document claims the priority and benefits of the Korean patent application number 10-2020-0146324, filed on Nov. 4, 2020, which is incorporated herein by reference in its entirety.

TECHNICAL FIELD

The embodiments of the disclosed technology disclosed in this patent document generally relate to an electronic device, and more particularly, to a storage device and an operating method thereof.

BACKGROUND

A storage device is used to store data under the control of a host device such as a computer or a smart phone. The storage device may include a memory device for storing data and a memory controller for controlling the memory device. The memory device is classified into a volatile memory device and a nonvolatile memory device.

The volatile memory device only retains its data while the device is powered and loses its data when power is lost. The volatile memory device may include, for example, a Static Random Access Memory (SRAM) and a Dynamic Random Access Memory (DRAM).

The nonvolatile memory device retains stored data even in the absence of power supply and thus does not lose its data when power is lost. The nonvolatile memory device may include, for example, a Read Only Memory (ROM), a Programmable ROM (PROM), an Electrically Programmable ROM (EPROM), an Electrically Erasable ROM (EEROM), and a flash memory.

SUMMARY

The embodiments of the disclosed technology relate to a storage device than can perform an improved garbage collection operation.

In an aspect of the disclosed technology, a storage device is disclosed. The storage device may include a memory device including a plurality of system blocks for storing system data, and a memory controller configured to control the memory device to store cyclic system data that is cyclically provided from a host, in an open system block among the plurality of system blocks, and control the memory device to perform a garbage collection operation on the plurality of system blocks, when a size of data stored in the open system block reaches a predetermined size, wherein the cyclic system data includes a plurality of data slices provided from the host at predetermined cycles, and wherein the predetermined size is determined based on a size of the cyclic system data provided for a period of time corresponding to a common multiple of the predetermined cycles.

In another aspect of the disclosed technology, a data storage device is disclosed. The data storage device may include a memory device including a plurality of memory blocks for storing system data, and a memory controller configured to control the memory device to store first system data that is cyclically provided from a host and second system data that is provided from the host in a noncyclical fashion, in an open memory block among the plurality of memory blocks for storing system data, and control the memory device to perform a garbage collection operation on the plurality of memory blocks at predetermined cycles, wherein the first system data includes a plurality of data slices provided from the host, and wherein the predetermined cycles are proportional to a common multiple of cycles of the plurality of data slices.

In another aspect of the disclosed technology, a method for operating a storage device is disclosed. The method may include a plurality of system blocks, the method including: storing cyclic system data that is cyclically provided from a host and random system data that is provided from the host in a noncyclical fashion, in an open system block among the plurality of system blocks; and performing a garbage collection operation on the plurality of system blocks, when a size of data stored in the open system block reaches a predetermined size, wherein the cyclic system data includes a plurality of data slices provided for every predetermined cycle from the host, and wherein the predetermined size is determined based on a size of the cyclic system data provided for a period of time corresponding to a common multiple of cycles of the plurality of data slices.

In another aspect of the disclosed technology, a data storage device is disclosed. The data storage device may include a memory device including a plurality of memory blocks for storing system data, and a memory controller coupled in communication with and configured to control the memory device, including controlling the memory device to store first system data that is cyclically provided from a host, in an open memory block in the memory device that is available for write operations, among the plurality of memory blocks, and control the memory device to perform a garbage collection operation on the plurality of memory blocks, when a size of data stored in the open memory block reaches a predetermined size, wherein the first system data includes a plurality of data slices provided from the host at predetermined cycles, and wherein the predetermined size is determined by using a common multiple of the predetermined cycles.

In another aspect of the disclosed technology, a data storage device is disclosed. The data storage device may include a memory device including a plurality of memory blocks for storing system data, and a memory controller coupled in communication with and configured to control the memory device, including controlling the memory device to store first system data in the memory device that is cyclically provided from a host and second system data that is provided from the host in a noncyclical fashion, in an open memory block among the plurality of memory blocks for storing system data, and control the memory device to perform a garbage collection operation on the plurality of memory blocks at predetermined cycles, wherein the first system data includes a plurality of data slices provided at the predetermined cycles from the host, and wherein the predetermined cycles are determined by using a common multiple of the predetermined cycles.

In another aspect of the disclosed technology, a method for operating a data storage device including a plurality of memory blocks is disclosed. The method may include storing first system data that is cyclically provided from a host and second system data that is provided from the host in a noncyclical fashion, in an open memory block among the plurality of memory blocks, and performing a garbage collection operation on the plurality of memory blocks, when a size of data stored in the open memory block reaches a predetermined size, wherein the first system data includes a plurality of data slices provided for every predetermined cycle from the host, and wherein the predetermined cycle is determined by using a common multiple of cycles of the plurality of data slices.

In another aspect of the disclosed technology, a storage device is disclosed. The storage device may include a memory device including a plurality of system blocks for storing system data; and a memory controller configured to store cyclic system data cyclically provided from a host in an open system block among the plurality of system blocks, and control the memory device to perform a garbage collection operation on the plurality of system blocks, when a size of the data stored in the open system block reaches a predetermined size, wherein the cyclic system data includes a plurality of data slices provided for every predetermined cycle from the host, and wherein the predetermined size is determined by using a common multiple of the predetermined cycles.

In another aspect of the disclosed technology, a data storage device is disclosed. The data storage device may include a memory device including a plurality of system blocks for storing system data; and a memory controller configured to store cyclic system data cyclically provided from a host and random system data non-cyclically provided from the host in an open system block among the plurality of system blocks, and control the memory device to perform a garbage collection operation on the plurality of system blocks in a predetermined cycle, wherein the cyclic system data includes a plurality of data slices provided for every predetermined cycle from the host, and wherein the predetermined cycle is determined by using a common multiple of cycles of the plurality of data slices.

In another aspect of the disclosed technology, a method for operating a storage device is disclosed. The method may include storing cyclic system data cyclically provided from a host and random system data non-cyclically provided from the host in an open system block among the plurality of system blocks; and performing a garbage collection operation on the plurality of system blocks, when a size of the data stored in the open system block reaches a predetermined size, wherein the cyclic system data includes a plurality of data slices provided for every predetermined cycle from the host, and wherein the predetermined cycle is determined by using a common multiple of cycles of the plurality of data slices.

DETAILED DESCRIPTION

The embodiments of the disclosed technology relate to a storage device can be implemented to perform an improved garbage collection operation in storage devices including those with a limited number of system memory blocks, i.e., system block.

Figure 1:
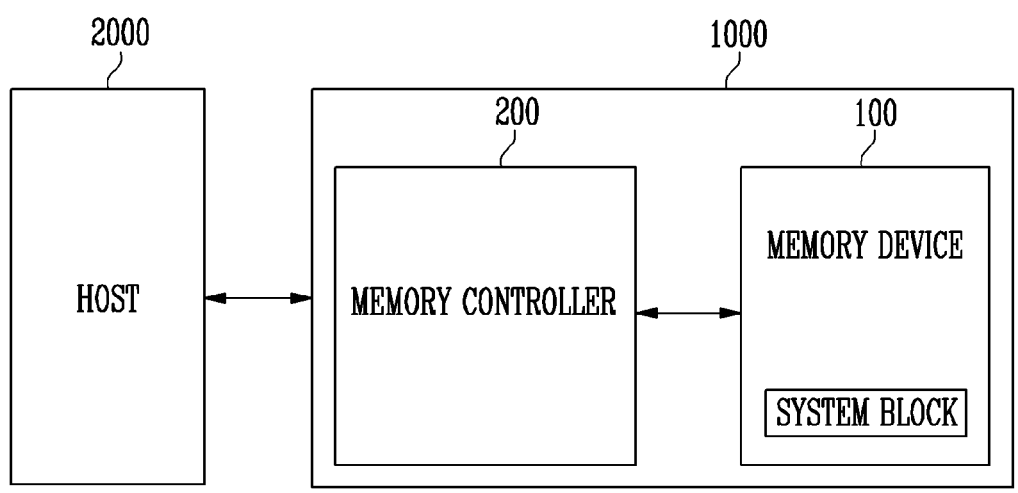
FIG. 1 is a block diagram illustrating a storage device based on an embodiment of the disclosed technology.

FIG. 1 is a block diagram illustrating a storage device based on an embodiment of the disclosed technology.

Referring to FIG. 1, the storage device 1000 is a device for storing data and may include a memory device 100 and a memory controller 200.

The storage device 1000 may be a device for storing data under the control of a host 2000, such as a mobile phone, a smart phone, an MP3 player, a laptop computer, a desktop computer, a game console, a display device, a tablet PC or an in-vehicle infotainment.

The storage device 1000 may be manufactured as any one of various types of storage devices according to a host interface that is a communication scheme with the host 2000. For example, the storage device 1000 may be implemented with any one of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 1000 may be implemented as any one of various kinds of package types. For example, the storage device 1000 may be implemented as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data or use stored data. The memory device 100 operates under the control of the memory controller 200. Also, the memory device 100 may include a plurality of memory dies, and each of the plurality of memory dies may include a memory cell array including a plurality of memory cells for storing data.

Each of the memory cells may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

The memory cell array may include a plurality of memory blocks. Each memory block may include a plurality of memory cells, and one memory block may include a plurality of pages. The page may be a unit for storing data in the memory device 100 or reading data stored in the memory device 100.

The memory device 100 may be implemented as a Double Data Rate Synchronous Dynamic Random Access Memory (DDR SDRAM), a Low Power Double Data Rate 4 (LPDDR4) SDRAM, a Graphics Double Data Rate (GDDR) SDRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is assumed and described.

The memory device 100 may receive a command and an address from the memory controller 200. The memory device 100 may access an area selected by the received address in the memory cell array. By accessing the selected area, the memory device 100 performs an operation corresponding to the received command on the selected area. For example, the memory device 100 may perform a write operation (program operation), a read operation, and an erase operation. The program operation may be an operation in which the memory device 100 records data in the area selected by the address. The read operation may include an operation in which the memory device 100 reads data from the area selected by the address. The erase operation may include an operation in which the memory device 100 erases data stored in the area selected by the address.

In accordance with an embodiment of the disclosed technology, the memory device 100 may include a plurality of system blocks. Specifically, the memory device 100 may store system data in the plurality of system blocks. In this patent document, the term "system data" is used to indicate data that can be used to operate the memory device or other electronic systems, and the term "system block" can be used to indicate a memory block that is used to store the system data. The system data may include cyclic system data cyclically provided from the host 2000 and random system data provided from the host 2000 in a noncyclical fashion. In addition, the cyclic system data may include a plurality of data slices, and the plurality of data slices may be repeatedly provided for every cycle. For example, the cyclic system data may include a read count table representing a number of read operations performed on a plurality of memory blocks included in the memory device 100, storage space information, fail information on read/program, or the like. In one example, the fail information may indicate whether at least one of the plurality of memory blocks has failed a read operation.

The ransom system data may include security information for security and encryption of a system. Specifically, the random system data may be data for protecting data stored in the memory device 100 and supporting an encryption function for maintaining security. For example, the random system data may include a security key for encoding and decoding on data, a password, or the like.

The memory device 100 may store the system data in an open system block among the plurality of system blocks. In this patent document, the terms "open system block" or "open block" can be used to indicate a memory block of the data storage device that is active at a given time. For example, the term "open system block" or "open block" may be used indicate erased (empty) memory cells and/or partially programmed memory cells that are available for further writes by the hosts.

The memory controller 200 may control overall operations of the storage device 1000.

When power is applied to the storage device 1000, the memory controller 200 may execute firmware (FW). The FW may include a Host Interface Layer (HIL) which receives a request input from the host 2000 or outputs a response to the host 2000, a Flash Translation Layer (FTL) which manages an operation between an interface of the host 2000 and an interface of the memory device 100, and a Flash Interface Layer (FIL) which provides a command to the memory device 100 or receives a response from the memory device 100.

The memory controller 200 may receive data and a Logical Address (LA) from the host 2000, and translate the LA into a Physical Address (PA) representing an address of memory cells included in the memory device 100 in which data is to be stored. The LA may be a Logical Block Address (LBA), and the PA may be a Physical Block Address (PBA).

The memory controller 200 may control the memory device 100 to perform a program operation, a read operation, an erase operation, or the like in response to a request from the host 2000. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

The memory controller 200 may control the memory device 100 to autonomously perform a program operation, a read operation, or an erase operation regardless of any request from the host 2000. For example, the memory controller 200 may control the memory device 100 to perform a program operation, a read operation, or an erase operation, which is used to perform a background operation such as wear leveling, garbage collection, or read reclaim.

The host 2000 may communicate with the storage device 1000, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

Figure 2:
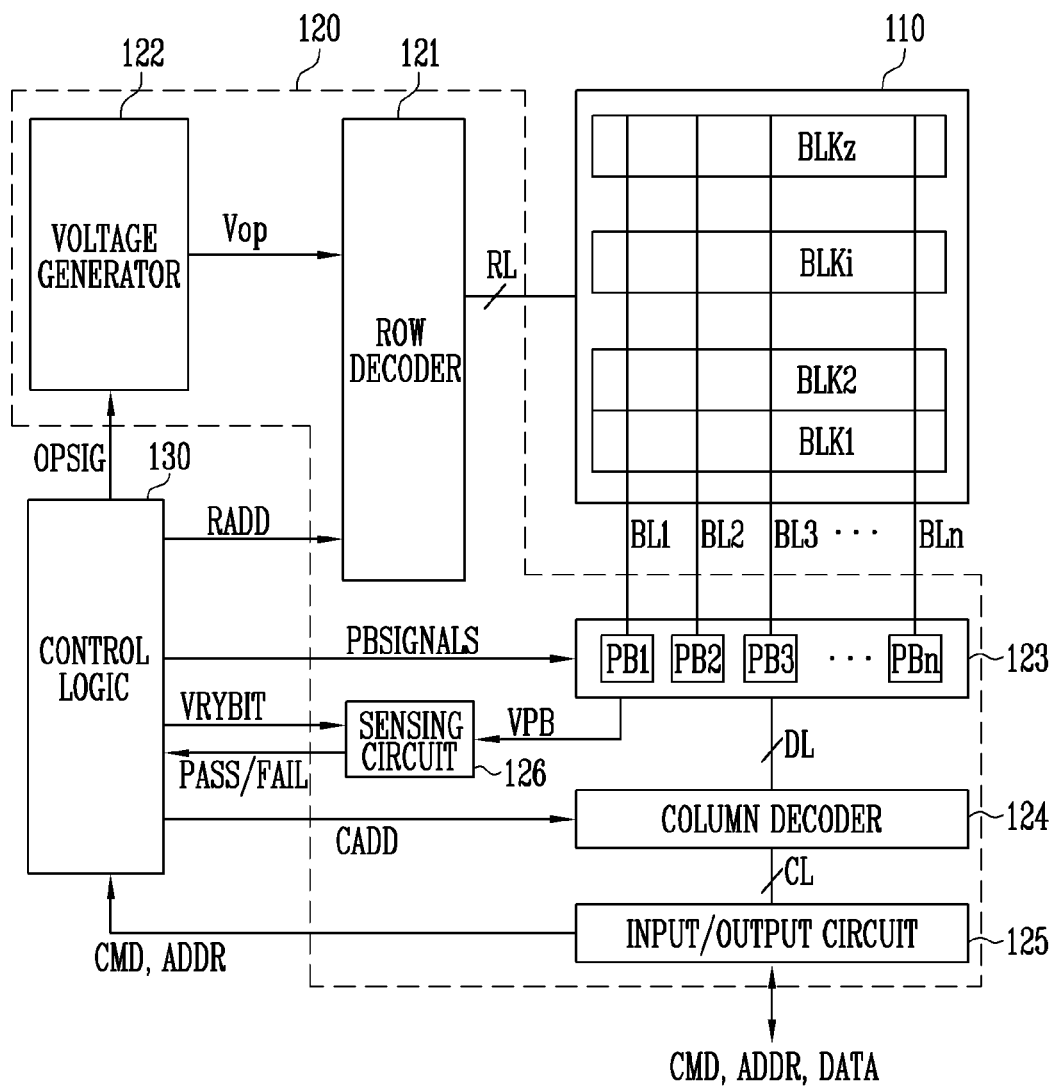
FIG. 2 is a block diagram illustrating a memory device based on an embodiment of the disclosed technology.

FIG. 2 is a block diagram illustrating a memory device based on an embodiment of the disclosed technology.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are connected to a row decoder 121 through row lines RL. The row lines RL may include at least one source select line, a plurality of word lines, and at least one drain select line. The plurality of memory blocks BLK1 to BLKz are connected to a page buffer group 123 through bit lines BL1 to BLn. Each of the plurality of memory blocks BLK1 to BLKz includes a plurality of memory cells. In an embodiment, the plurality of memory cells may be nonvolatile memory cells. Memory cells connected to the same word line may be defined as one page. Therefore, one memory block may include a plurality of pages.

Each of the memory cells included in the memory cell array 110 may be configured as a Single Level Cell (SLC) storing one data bit, a Multi-Level Cell (MLC) storing two data bits, a Triple Level Cell (TLC) storing three data bits, or a Quadruple Level Cell (QLC) storing four data bits.

The peripheral circuit 120 may be configured to perform a program operation, a read operation or an erase operation on a selected area of the memory cell array 110 under the control of the control logic 130. That is, the peripheral circuit 120 may drive the memory cell array 110 under the control of the control logic 130. For example, the peripheral circuit 120 may apply various operating voltages to the row lines RL and the bit lines BL1 to BLn or discharge the applied voltages under the control of the control logic 130.

Specifically, the peripheral circuit 120 may include the row decoder 121, a voltage generator 122, the page buffer group 123, a column decoder 124, an input/output circuit 125, and a sensing circuit 126.

The row decoder 121 may be connected to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 may operate under the control of the control logic 130. The row decoder 121 may receive a row address RADD from the control logic 130. Specifically, the row decoder 121 may decode the row address RADD. The row decoder 121 may select at least one memory block among the memory blocks BLK1 to BLKz according to the decoded address. Also, the row decoder 121 may select at least one word line of the selected memory block to apply voltages generated by the voltage generator 122 to the at least one word line WL according the decoded address.

For example, in a program operation, the row decoder 121 may apply a program voltage to the selected word line, and may apply a program pass voltage having a level lower than that of the program voltage to unselected word lines. In a program verify operation, the row decoder 121 may apply a verify voltage to the selected word line, and may apply a verify pass voltage higher than the verify voltage to the unselected word lines. In a read operation, the row decoder 121 may apply a read voltage to the selected word line, and may apply a read pass voltage higher than the read voltage to the unselected word lines.

In an embodiment, an erase operation of the memory device 100 may be performed in a memory block unit. In the erase operation, the row decoder 121 may select one memory block according to the decoded address. In the erase operation, the row decoder 121 may apply a ground voltage to word lines connected to the selected memory block.

The voltage generator 122 may operate under the control of the control logic 130. Specifically, the voltage generator 122 may generate a plurality of voltages by using an external power voltage supplied to the memory device 100 under the control of the control logic 130. For example, the voltage generator 122 may generate a program voltage, a verify voltage, a pass voltage, a read voltage, an erased voltage, and the like under the control of the control logic 130. That is, the voltage generator 122 may generate various operating voltages Vop used in program, read, and erase operations in response to an operation signal OPSIG.

In an embodiment, the voltage generator 122 may generate an internal power voltage by regulating the external power voltage. The internal power voltage generated by the voltage generator 122 may be used as an operation voltage of the memory cell array 110.

In an embodiment, the voltage generator 122 may generate a plurality of voltages by using the external power voltage or the internal power voltage. For example, the voltage generator 122 may include a plurality of pumping capacitors for receiving the internal power voltage, and generate the plurality of voltages by selectively activating the plurality of pumping capacitors under the control of the control logic 130. In addition, the plurality of generated voltages may be supplied to the memory cell array 110 by the row decoder 121.

The page buffer group 123 may include first to nth page buffers PB1 to PBn. The first to nth page buffers PB1 to PBn may be connected to the memory cell array 110 respectively through first to nth bit lines BL1 to BLn. Also, the first to nth bit lines BL1 to BLn may operate under the control of the control logic 130. Specifically, the first to nth bit lines BL1 to BLn may operate in response to page buffer control signals PBSIGNALS. For example, the first to nth page buffers PB1 to PBn may temporarily store data received through the first to nth bit lines BL1 to BLn, or sense a voltage or current of the bit lines BL1 to BLn in a read or verify operation.

Specifically, in a program operation, the first to nth page buffers PB1 to PBn may transfer data DATA received through the input/output circuit 125 to selected memory cells through the first to nth bit lines BL1 to BLn, when a program voltage is applied to a selected word line. Memory cells of a selected page may be programmed according to the transferred data DATA. A memory cell connected to a bit line to which a program allow voltage (e.g., a ground voltage) is applied may have an increased threshold voltage. A threshold voltage of a memory cell connected to a bit line to which a program inhibit voltage (e.g., a power voltage) is applied may be maintained.

In a program verify operation, the first to nth page buffers PB1 to PBn may read page data from the selected memory cells through the first to nth bit lines BL1 to BLn.

In a read operation, the first to nth page buffers PB1 to PBn may read data DATA from the memory cells of the selected page through the first to nth bit lines BL1 to BLn, and outputs the read data DATA to the input/output circuit 125 under the control of the column decoder 124.

In an erase operation, the first to nth page buffers PB1 to PBn may float the first to nth bit lines BL1 to BLn.

The column decoder 124 may communicate data between the input/output circuit 125 and the page buffer group 123 in response to a column address CADD. For example the column decoder 124 may communicate data with the first to nth page buffers PB1 to PBn through data lines DL, or communicate data with the input/output circuit 125 through column lines CL.

The input/output circuit 125 may transfer a command CMD and an address ADDR, which are received from the memory controller 200, to the control logic 130, or exchange data DATA with the column decoder 124.

In a read operation or verify operation, the sensing circuit 126 may generate a reference current in response to an allow bit signal VRYBIT, and output a pass signal PASS or a fail signal FAIL by comparing a sensing voltage VPB received from the page buffer group 123 and a reference voltage generated by the reference current. In this patent document, the term "pass" can be used to indicate a program operation has succeeded, and the term "fail" can be used to indicate a program operation has failed.

The control logic 130 may control the peripheral circuit 120 by outputting the operation signal OPSIG, the row address RADD, the page buffer control signals PBSIG-NALS, and the allow bit signal VRYBIT in response to the command CMD and the address ADDR.

Also, the control logic 130 may determine whether the verify operation has passed or failed in response to the pass or fail signal PASS or FAIL. Also, the control logic 130 may control the page buffer group 123 to temporarily store verify information including the pass or fail signal PASS or FAIL in the page buffer group 123. Specifically, the control logic 130 may determine a program state of a memory cell in response to the pass or fail signal PASS or FAIL. For example, when the memory cell operates as a Triple Level Cell (TLC), the control logic 130 may determine whether the program state of the memory cell is any one of an erase state E or first to seventh program states P1 to P7.

Figure 3:
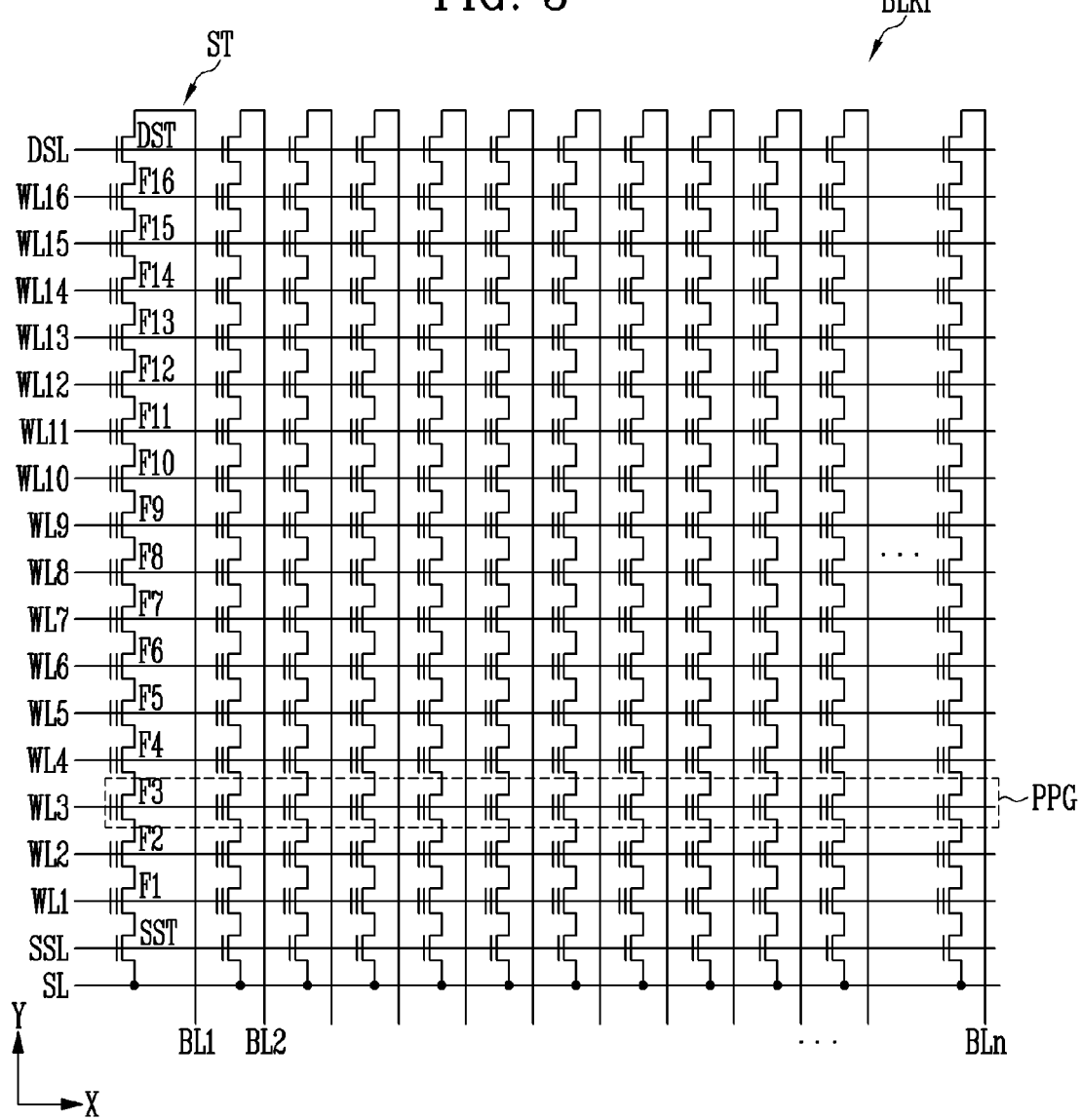
FIG. 3 is a diagram illustrating a memory block based on an embodiment of the disclosed technology.

FIG. 3 is a diagram illustrating a memory block based on an embodiment of the disclosed technology.

Referring to FIG. 3, in the memory block BLKi, a plurality of word lines arranged in parallel to each other may be connected between a first select line and a second select line. The first select line may be a source select line SSL, and the second select line may be a drain select line DSL. In some implementations, the memory block BLKi may include a plurality of strings ST connected between bit lines BL1 to BLn and a source line SL. The bit lines BL1 to BLn may be respectively connected to the strings ST, and the source line SL may be commonly connected to the strings ST. The structures of the strings ST may be identical to one another, and therefore, a string ST connected to a first bit line BL1 will be described in detail as an example. In this patent document, the term "string" can be used to indicate a memory cell string that includes a plurality of memory cells coupled in series.

The string ST may include a source select transistor SST, a plurality of memory cells F1 to F16, and a drain select transistor DST, which are connected in series to each other between the source line SL and the first bit line BL1. At least one source select transistor SST and at least one drain select transistor DST may be included in one string ST, and memory cells of which number is greater than that of the memory cells F1 to F16 shown in the drawing may be included in the one string ST.

A source of the source select transistor SST may be connected to the source line SL, and a drain of the drain select transistor DST may be connected to the first bit line BL1. The memory cells F1 to F16 may be connected in series between the source select transistor SST and the drain select transistor DST. Gates of source select transistors SST included in different strings ST may be connected to the source select line SSL, and gates of drain select transistors DST included in different strings ST may be connected to the drain select line DSL. Gates of the memory cells F1 to F16 may be connected to a plurality of word lines WL1 to WL16. A group of memory cells connected to the same word line among memory cells included in different strings ST may be referred to as a physical page PPG. Therefore, physical pages PPG corresponding to the number of the word lines WL1 to WL16 may be included in the memory block BLKi.

Each of the memory cells may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

The SLC may store one-bit data. One physical page PPG of the SLC may store one logical page (LPG) data. The one LPG data may include data bits of which number corresponding to that of cells included in the one physical page PPG.

The MLC, the TLC, and the QLC may store two or more-bit data. One physical page PPG may store two or more LPG data.

Figure 4:
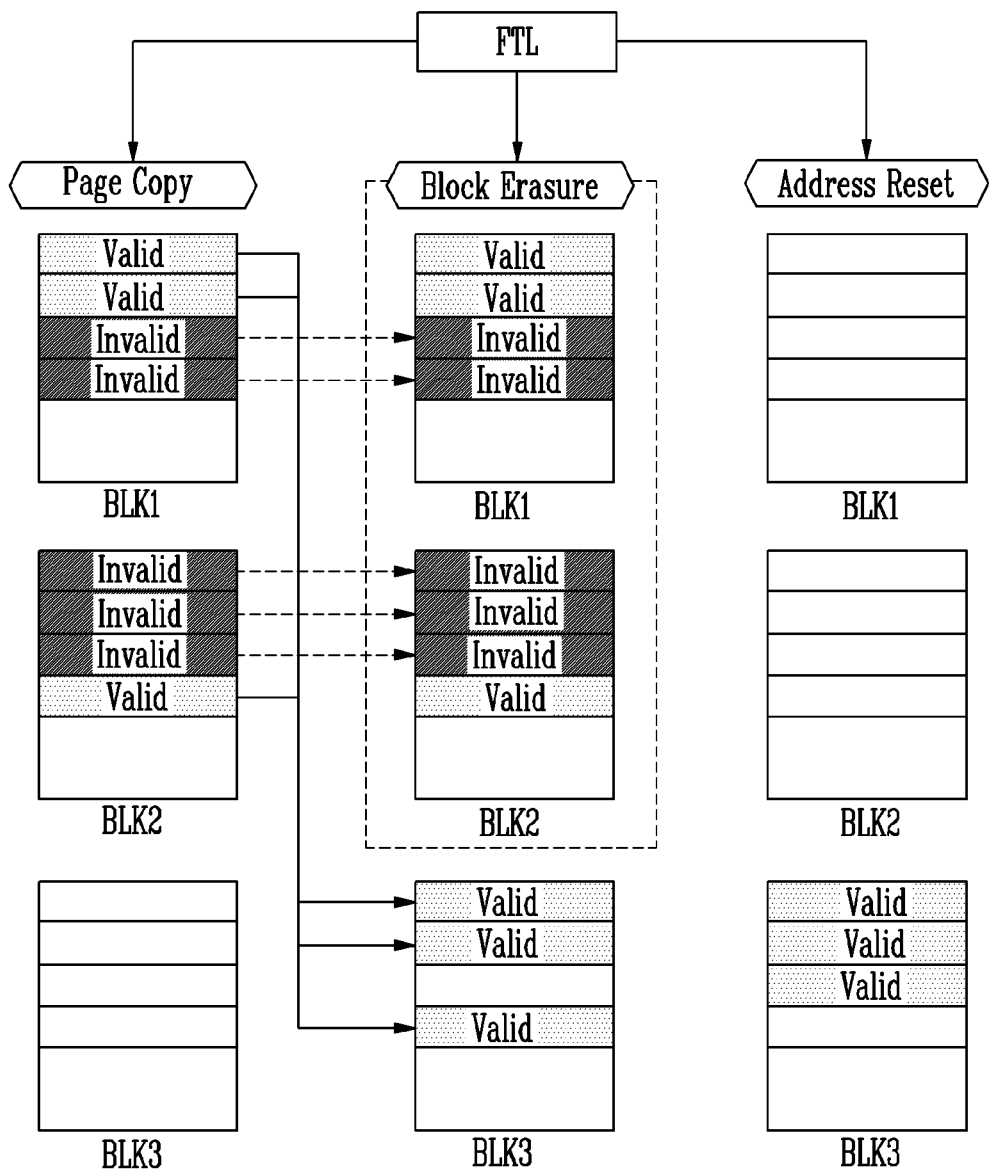
FIG. 4 is a diagram illustrating a garbage collection operation based on an embodiment of the disclosed technology.

FIG. 4 is a diagram illustrating a garbage collection operation based on an embodiment of the disclosed technology.

Referring to FIG. 4, the memory controller 200 may detect a page state (e.g., a valid page state, an invalid page state, or the like) for each of a plurality of pages PG included in each of a plurality of memory blocks BLK in the memory device 100 with reference to a valid page table VPT. The valid page table VPT may include page state information of each of a plurality of pages PG (information for checking whether the page is a valid page) such that the memory controller 200 can detect a page state (e.g., a valid page state, an invalid page state, or the like) for each of the plurality of pages PG.

Also, the memory controller 200 may move the plurality of detected valid pages to an open block. For example, each of a first memory block BLK1 and a second memory block BLK2 may include at least one valid page. In addition, a third memory block BLK3 may be an open block or a target block, to which the valid page is to be moved. Specifically, the memory controller 200 may control the memory device 100 to move the valid pages stored in the first memory block BLK1 and the second memory block BLK2 to the third memory block BLK3.

Also, the memory controller 200 may erase the first memory block BLK1 and the second memory block BLK2. The memory controller 200 may secure two free blocks by erasing the first memory block BLK1 and the second memory block BLK2, and secure a data storage space by erasing invalid data. Also, the memory controller 200 may organize the valid and invalid pages by performing address resetting.

The memory controller 200 moves the valid pages distributed and stored in the first memory block BLK1 and the second memory block BLK2 to the third memory block BLK3. Thus, free blocks, and a storage space corresponding to that of an area in which the invalid pages are stored can be secured.

In an embodiment of the disclosed technology, the memory controller 200 may control the memory device 100 to perform a garbage collection operation of storing cyclic system data cyclically provided from the host 2000 in open system blocks, and organizing existing cyclic system data generated when new cyclic system data is stored. Specifically, cyclic system data stored lastly among the cyclic system data provided from the host 2000 may be valid data or data stored in a valid page, and data previously stored in a system block may be invalid data or data stored in an invalid page. The memory controller 200 controls the memory device 100 to perform a garbage collection operation of removing invalid data or data stored in an invalid page, and moving valid data or data stored in a valid page to an open block or a target block, so that a storage space in the memory device 100 can be secured.

Figure 5:
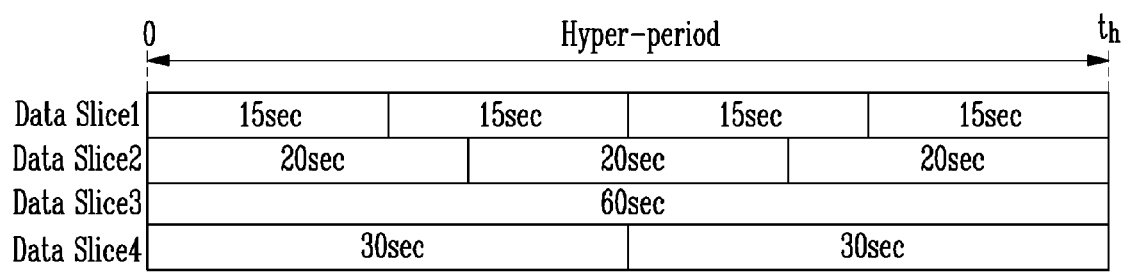
FIG. 5 is a diagram illustrating a hyper-period based on an embodiment of the disclosed technology.

FIG. 5 is a diagram illustrating a hyper-period based on an embodiment of the disclosed technology.

Referring to FIG. 5, a hyper-period $t_h$ of a plurality of data slices is illustrated. The hyper-period $t_h$ may indicate a time corresponding to a least common multiple of cycles of the plurality of data slices.

Specifically, a first data slice may be system data repeatedly stored for every cycle of 15 seconds from the host 2000. Similarly, a second data slice may be system data repeatedly stored for every cycle of 20 seconds from the host 2000, a third data slice may be system data repeatedly stored for every cycle of 60 seconds from the host 2000, and a fourth data slice may be system data repeatedly stored for every cycle of 30 seconds from the host 2000. That is, the first to fourth data slices may be cyclic system data cyclically provided from the host 2000. The cyclic system data may include a read count table representing a number of read operations performed on a plurality of memory blocks included in the memory device 100, storage space information, fail information on read/program, or the like. In one example, the fail information may indicate whether at least one of the plurality of memory blocks has failed an operation.

The memory controller 200 may detect a cycle of the cyclic system data including a plurality of data slices provided from the host 2000. Also, the memory controller 200 may calculate a time corresponding to a common multiple including a least common multiple of cycles of the data slices by using a cycle of each of the data slices. The time corresponding to the least common multiple of the cycles of the plurality of data slices may be a hyper-period $t_h$. For example, the memory controller 200 may calculate that a hyper-period $t_h$ of the first to fourth data slices is 60 seconds. Herein, a cycle of each data slice indicates that the data slice can be repeatedly provided from the host 2000.

Also, the memory controller 200 may calculate an amount of cyclic system data stored during the hyper-period $t_h$. Specifically, the first data slice may be stored while four cycles are repeated during the hyper-period $t_h$, and the memory controller 200 may calculate that the first data slice is to be stored by 4 (cycle)×an amount (data slice1/cycle) of the first data slice stored per unit cycle during the hyper-period $t_h$. In the same method, the memory controller 200 may calculate an amount of the second to fourth data slices stored during the hyper-period $t_h$.

Figure 6:
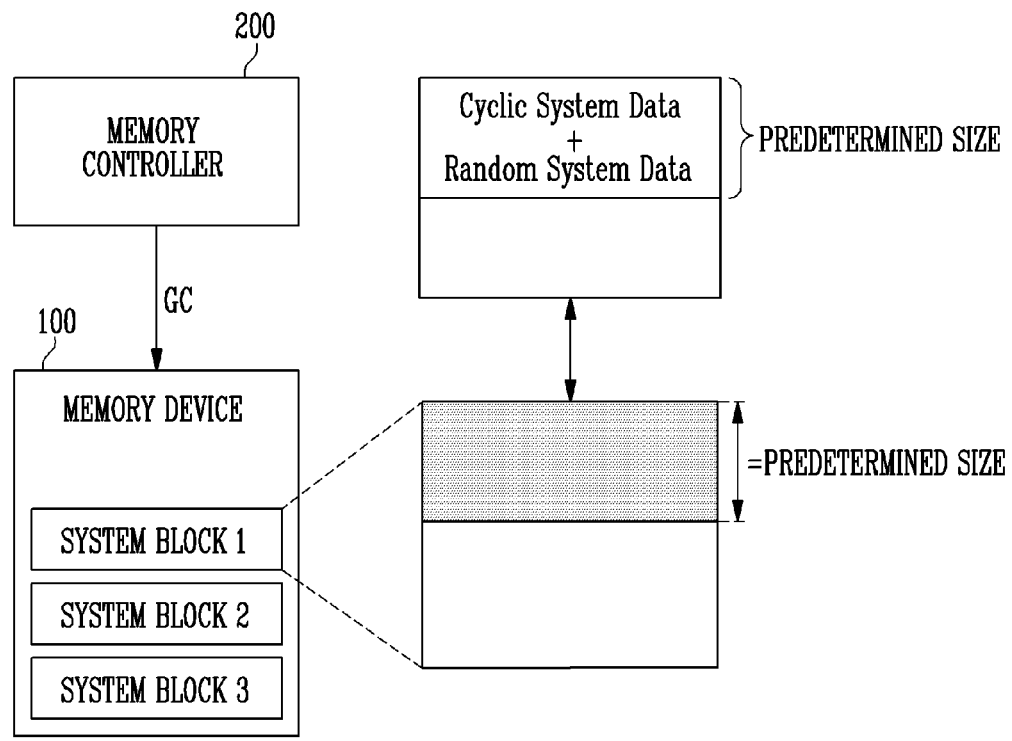
FIG. 6 is a diagram illustrating a method for performing garbage collection based on an embodiment of the disclosed technology.

FIG. 6 is a diagram illustrating a method for performing garbage collection based on an embodiment of the disclosed technology.

Referring to FIG. 6, the memory controller 200 which controls the memory device 100 to perform a garbage collection operation is illustrated. Specifically, the memory controller 200 may control the memory device 100 to perform the garbage collection operation on a plurality of system blocks, when data stored in an open system block reaches a predetermined size. The predetermined size may be determined by using a common multiple of cycles of a plurality of data slices. Specifically, the memory controller 200 may calculate a hyper-period $t_h$ as a time corresponding to a least common multiple of the cycles of the plurality of data slices. The memory controller 200 may calculate a data amount of the plurality of data slices, which is stored during the hyper-period $t_h$. Cyclic system data may include a read count table representing a number of read operations performed on a plurality of memory blocks included in the memory device 100, storage space information, fail information on read/program, or the like.

The memory controller 200 may set the predetermined size including a size of data of the plurality of data slices provided from the host 2000 during the hyper-period $t_h$ and a size allocated to store random system data. Alternatively, the memory controller 200 may set, as the predetermined size, a size corresponding to a multiple of the size of the data of the plurality of data slices provided from the host 2000 during the hyper-period $t_h$.

Also, the memory controller 200 may control the memory device 100 to perform the garbage collection operation on a plurality of system blocks, when an amount of the data stored in the open system block of the memory device 100 reaches the predetermined size.

Figure 7:
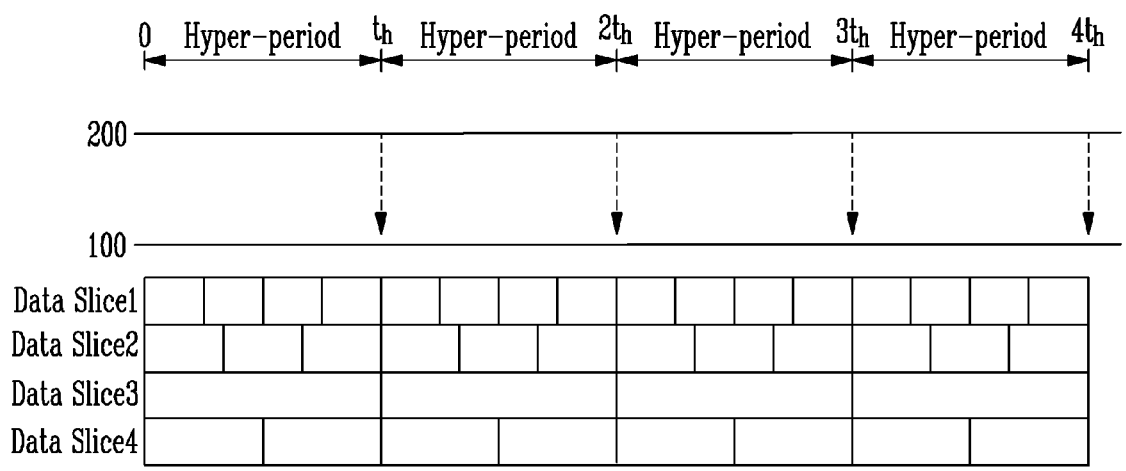
FIG. 7 is a diagram illustrating a method for performing garbage collection based on an embodiment of the disclosed technology.

FIG. 7 is a diagram illustrating a method for performing garbage collection based on an embodiment of the disclosed technology.

Referring to FIG. 7, the memory device 100 and the memory controller 200 which controls the memory device 100 to perform garbage collection for every constant cycle are illustrated.

Specifically, the memory device 100 may store cyclic system data cyclically provided from the host 2000 and random system data provided from the host 2000 in a noncyclical fashion. For convenience of description, first to fourth data slices of the cyclic system data provided cyclically are illustrated in FIG. 7. The memory controller 200 may control the memory device 100 to store system data provided from the host 2000 in an open system block. Also, the memory controller 200 may control the memory device 100 to perform a garbage collection operation in a predetermined cycle such that the memory device 100 secures a storage space in which the system data is to be stored.

Specifically, the memory controller 200 may control the memory device 100 to perform the garbage collection operation for every predetermined cycle corresponding to a common multiple of cycles of a plurality of data slices. The time corresponding to a least common multiple of the cycles of the plurality of data slices may be a hyper-period $t_h$.

For example, the memory controller 200 may control the memory device 100 to perform the garbage collection operation for each of n (n is a natural number) hyper-periods $t_h$. That is, the memory controller 200 may control the memory device 100 to perform the garbage collection operation for every time corresponding to $t_h$ or to perform the garbage collection operation for every cycle corresponding to $2t_h$ or $4t_h$.

When the memory controller 200 controls the memory device 100 to perform the garbage collection operation for every cycle corresponding to one hyper-period $t_h$, the storage device 1000 may store system data, using a limited number of system memory blocks, by effectively removing data stored in an invalid page or invalid data.

Alternatively, when the memory controller 200 controls the memory device 100 to perform the garbage collection operation for every cycle corresponding to two or more hyper-periods $t_h$, the storage device 1000 may decrease a number of read operations, a number of program operations, and a number of erase operations that are performed on a system memory block, so that the lifetime of the system block can be efficiently managed.

Figure 8:
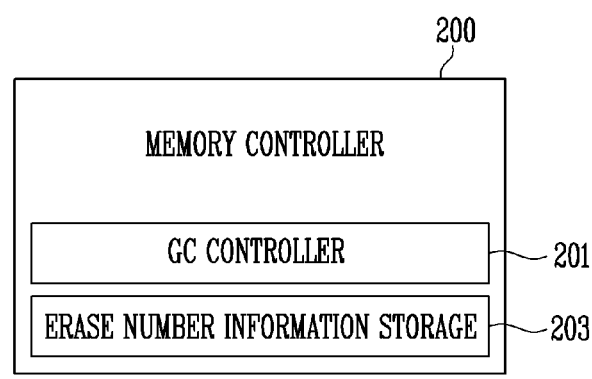
FIG. 8 is a diagram illustrating a configuration of a memory controller based on an embodiment of the disclosed technology.

FIG. 8 is a diagram illustrating a configuration of a memory controller based on an embodiment of the disclosed technology.

Referring to FIG. 8, the memory controller 200 may include a garbage collection (GC) controller 201 and an erase number information storage 203.

Based on an embodiment of the disclosed technology, the memory controller 200 may control a garbage collection operation of the memory device 100 by using the garbage collection controller 201. Specifically, the garbage collection controller 201 may determine a victim block of the garbage collection operation. When a size of data stored in open system blocks included in the memory device 100 in which system data is stored reaches a predetermined size, the garbage collection controller 201 may determine a corresponding block as the victim block. Also, the garbage collection controller 201 may control the memory device 100 to move valid data stored in the system block determined as the victim block to another system block. The garbage collection controller 201 may determine a target block, based on a number of erase operations performed on the system block.

Specifically, the memory controller 200 may count a number of erase operations performed on system memory blocks, and store, in the erase number information storage 203, information on the number of erase operations performed on the system blocks. In addition, the garbage collection controller 201 may determine a system block having a smallest number of erase operations performed on the system block, among the system blocks, as a target block to which valid data is to be moved.

The memory controller 200 may store and manage cyclic system data and random system data in a separate system block. Since the cyclic system data is the system data cyclically provided from the host 2000, a large amount of invalid data may occur as compared with the random system data. That is, the cyclic system data may have high necessity of the garbage collection operation, as compared with the random system data. The memory controller 200 may manage the cyclic system data and the random data system as a separate system block, so that frequent movement of system data can be prevented. For example, the memory controller 200 may control the memory device 100 to store the cyclic system data and the random system data respectively in separate open system blocks during the garbage collection operation. Alternatively, the memory controller 200 may control the memory device 100 to store the cyclic system data and the random system data respectively in separate open system blocks, when the memory controller 200 receives system data from the host 2000. Also, the memory controller 200 may control the memory device 100 to perform a media scan operation on the open system block in which the random system data is stored, so that reliability of the stored random system data can be improved.

Figure 9:
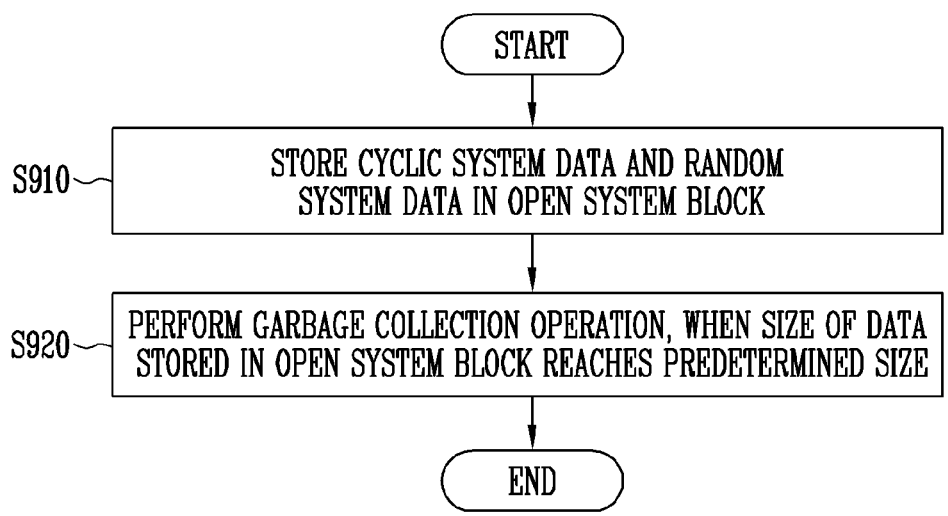
FIG. 9 is a diagram illustrating an operating method of the storage device based on an embodiment of the disclosed technology.

FIG. 9 is a diagram illustrating an operating method of the storage device based on an embodiment of the disclosed technology.

Referring to FIG. 9, the storage device 1000 may include a plurality of system blocks. The system blocks may be blocks for storing system data. The storage device 1000 may allocate some of memory blocks as a system block and use the system block as a block for storing the system data. The system data may include cyclic system data cyclically provided from the host 2000 to the storage device 1000 and random system data provided from the host 2000 to the storage device 1000 in a noncyclical fashion.

The storage device 1000 may store cyclic system data and random system data in an open system block (S910). The cyclic system data may include a read count table representing a number of read operations performed on a plurality of memory blocks included in the storage device 1000, storage space information, fail information on read/program, or the like. In addition, the random system data may include security information for security and encryption of a system. Specifically, the random system data may be data for protecting data stored in the storage device 1000 and supporting an encryption function for maintaining security. For example, the random system data may include a security key for encoding and decoding on data, a password, or the like.

Since the storage device 1000 allocates and uses some of the memory blocks as a system block for storing system data, the system data may be stored and used by using a limited number of system blocks included in the storage device 1000. In order to efficiently manage the limited number of system blocks, the storage device 1000 may perform a garbage collection operation on the system blocks.

Specifically, when a size of the data stored in the open system block reaches a predetermined size, the storage device 1000 may perform the garbage collection operation on the plurality of system blocks (S920). The predetermined sizes may be determined by using a least common multiple of cycles of a plurality of data slices. Specifically, the storage device 1000 may determine, as the predetermined size, a size of the cyclic system data provided from the host 2000 for a time corresponding to the least common multiple of the cycles of the plurality of data slices repeatedly provided from the host 2000 for every cycle and a size allocated to store the random system data.

The storage device 1000 efficiently performs the garbage collection operation on the system blocks in which the system data is stored, so that the overhead for moving valid data and erasing invalid data can be minimized.

The storage device 1000 may count a number of erase operations performed on each of the plurality of system blocks. The storage device 1000 may determine a system block that has performed a smallest number of erase operations on the system block, among the plurality of system blocks, as a target block to which valid data stored in a victim block is to be moved, based on the number of erase operations performed on each of the plurality of system blocks.

Figure 10:
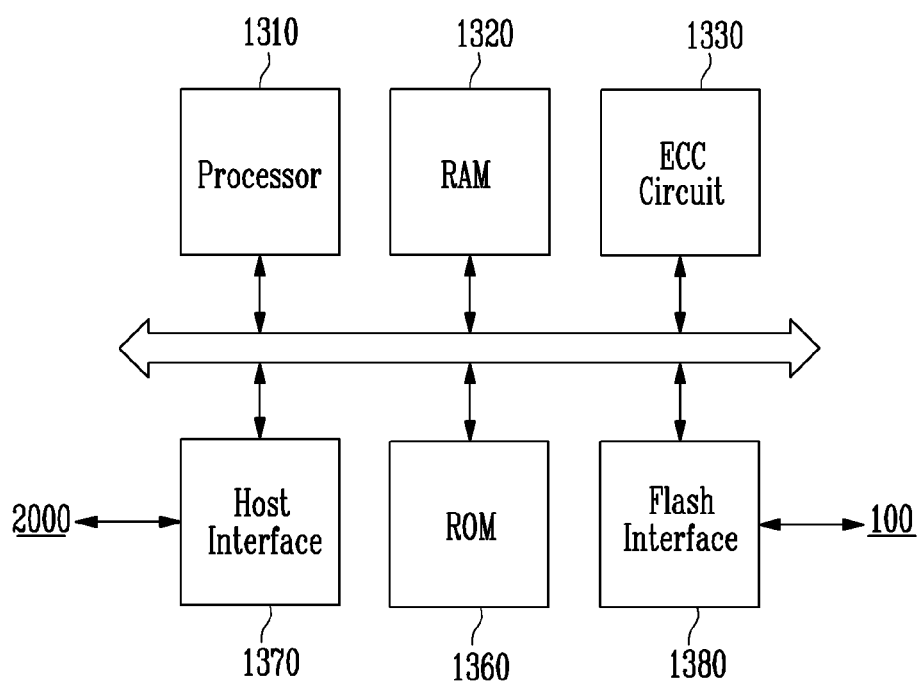
FIG. 10 is a diagram illustrating a memory controller based on an embodiment of the disclosed technology.

FIG. 10 is a diagram illustrating a memory controller based on an embodiment of the disclosed technology.

Referring to FIG. 10, the memory controller 1300 may include a processor 1310, a RAM 1320, and an ECC circuit 1330, a ROM 1360, a host interface 1370, and a flash interface 1380. The memory controller 1300 shown in FIG. 10 may be an embodiment of the memory controller 200 shown in FIG. 1.

The processor 1310 may communicate with the host 2000 by using the host interface 1370, and perform a logical operation to control an operation of the memory controller 1300. For example, the processor 1310 may load a program command, a data file, a data structure, etc., based on a request received from the host 2000 or an external device, and perform various operations or generate a command and an address. For example, the processor 1310 may generate various commands necessary for a program operation, a read operation, an erase operation, a suspend operation, and a parameter setting operation.

Also, the processor 1310 may perform a function of a Flash Translation Layer (FTL). The processor 1310 may translate a Logical Block Address (LBA) provided by the host 2000 into a Physical Block Address (PBA) through the FTL. The FTL may receive an LBA input, to translate the LBA into a PBA by using a mapping table. Several address mapping methods of the FTL exist according to mapping units. A representative address mapping method includes a page mapping method, a block mapping method, and a hybrid mapping method.

Also, the processor 1310 may generate a command without any request from the host 2000. For example, the processor 1310 may generate a command for background operations such as operations for wear leveling of the memory device 100 and operations for garbage collection of the memory device 100.

The RAM 1320 may be used as a buffer memory, a working memory, or a cache memory of the processor 1310. Also, the RAM 1320 may store codes and commands, which the processor 1310 executes. The RAM 1320 may store data processed by the processor 1310. Also, the RAM 1320 may be implemented, including a Static RAM (SRAM) or a Dynamic RAM (DRAM).

The ECC circuit 1330 may detect an error in a program operation or a read operation, and correct the detected error. Specifically, the ECC circuit 1330 may perform an error correction operation according to an Error Correction Code (ECC). Also, the ECC circuit 1330 may perform ECC encoding, based on data to be written to the memory device 100. The data on which the ECC encoding is performed may be transferred to the memory device 100 through the flash interface 1380. Also, the ECC circuit 1330 may perform ECC decoding on data received from the memory device 100 through the flash interface 1380.

The ROM 1360 may be used as a storage unit for storing various information necessary for an operation of the memory controller 1300. Specifically, the ROM 1360 may include a map table, and physical-to-logical address information and logical-to-physical address information may be stored in the map table. Also, the ROM 1360 may be controlled by the processor 1310.

The host interface 1370 may include a protocol for exchanging data between the host 2000 and the memory controller 1300. Specifically, the host interface 1370 may communicate with the host 2000 through at least one of various interface protocols such as a Universal Serial Bus (USB) protocol, a Multi-Media Card (MMC) protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer System Interface (SCSI) protocol, an Enhanced Small Disk Interface (ESDI) protocol, an Integrated Drive Electronics (IDE) protocol, and a private protocol.

The flash interface 1380 may communicate with the memory device 100 by using a communication protocol under the control of the processor 1310. Specifically, the flash interface 1380 may communicate a command, an address, and data with the memory device 100 through a channel. For example, the flash interface 1380 may include a NAND interface.

Figure 11:
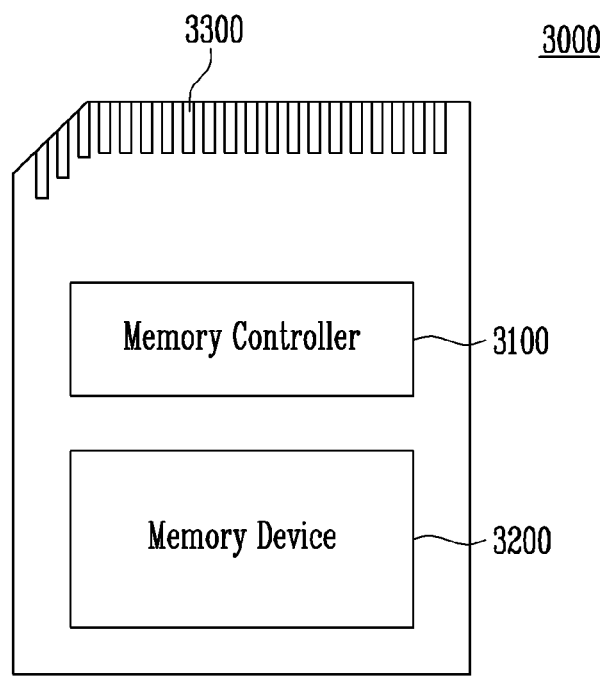
FIG. 11 is a diagram illustrating a memory card system based on an embodiment of the disclosed technology.

FIG. 11 is a diagram illustrating a memory card system based on an embodiment of the disclosed technology.

Referring to FIG. 11, the memory card system 3000 includes a memory controller 3100, a memory device 3200, and a connector 3300.

The memory controller 3100 may be connected to the memory device 3200. The memory controller 3100 may access the memory device 3200. For example, the memory controller 3100 may control read, write, erase, and background operations on the memory device 3200. The memory controller 3100 may provide an interface between the memory device 3200 and a host. Also, the memory controller 3100 may drive firmware for controlling the memory device 3200.

For example, the memory controller 3100 may include components such as a Random Access Memory (RAM), a processing unit, a host interface, a memory interface, and the error corrector.

The memory controller 3100 may communicate with an external device through the connector 3300. The memory controller 3100 may communicate with the external device (e.g., the host) according to a specific communication protocol. In some implementations, the memory controller 3100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

In some implementations, the memory device 3200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 3100 and the memory device 3200 may be integrated into a single semiconductor device, to constitute a memory card. For example, the memory controller 3100 and the memory device 3200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 12:
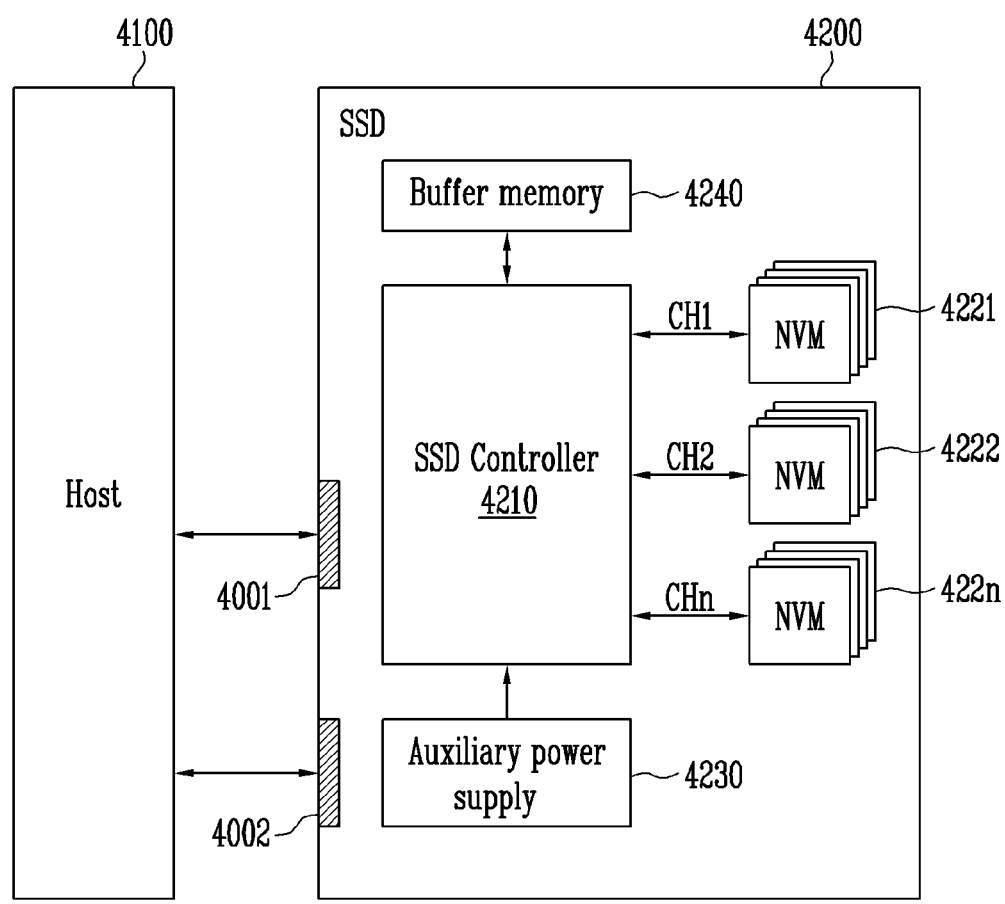
FIG. 12 is a diagram illustrating a Solid State Drive (SSD) based on an embodiment of the disclosed technology.

FIG. 12 is a diagram illustrating a Solid State Drive (SSD) based on an embodiment of the disclosed technology.

Referring to FIG. 12, the SSD system 4000 includes a host 4100 and an SSD 4200. The SSD 4200 exchanges a signal SIG with the host 4100 through a signal connector 4001, and receives power PWR through a power connector 4002. The SSD 4200 includes an SSD controller 4210, a plurality of flash memories 4221 to 422n, an auxiliary power supply 4230, and a buffer memory 4240.

In an embodiment, the SSD controller 4210 may serve as the memory controller 200 described with reference to FIG. 1. The SSD controller 4210 may control the plurality of flash memories 4221 to 422n in response to a signal SIG received from the host 4100. In some implementations, the signal SIG may be a signal based on an interface between the host 4100 and the SSD 4200. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 4230 may be connected to the host 4100 through the power connector 4002. The auxiliary power supply 4230 may receive power PWR input from the host 4100 and charge the power PWR. When the supply of power from the host 4100 is not smooth, the auxiliary power supply 4230 may provide power of the SSD 4200. In some implementations, the auxiliary power supply 4230 may be located in the SSD 4200, or be located at the outside of the SSD 4200. For example, the auxiliary power supply 4230 may be located on a main board, and provide auxiliary power to the SSD 4200.

The buffer memory 4240 may operate as a buffer memory of the SSD 4200. For example, the buffer memory 4240 may temporarily store data received from the host 4100 or data received from the plurality of flash memories 4221 to 422*n*, or temporarily store meta data (e.g., a mapping table) of the flash memories 4221 to 422*n*. The buffer memory 4240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 13:
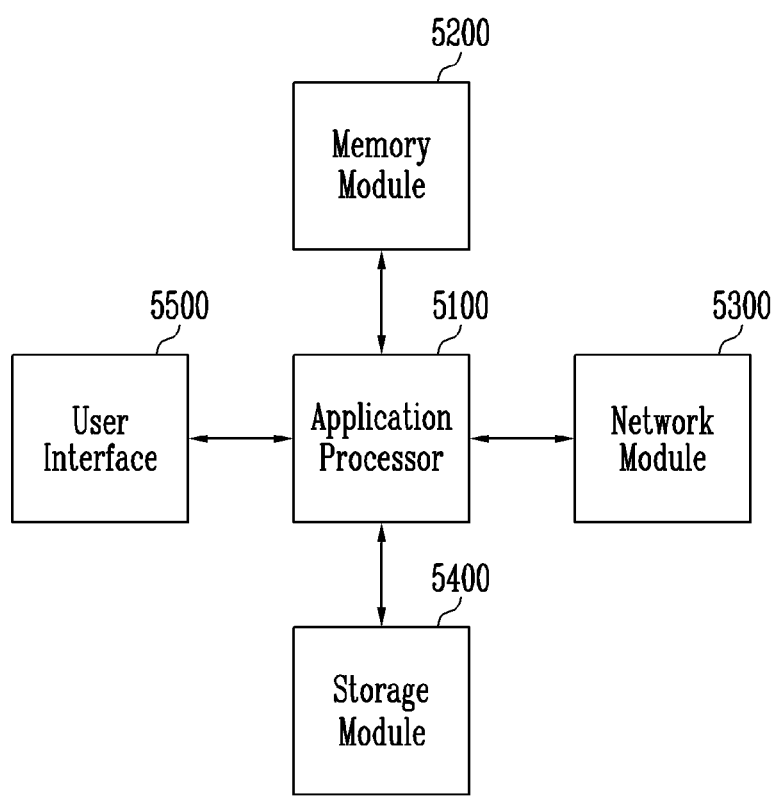
FIG. 13 is a diagram illustrating a user system based on an embodiment of the disclosed technology.

FIG. 13 is a diagram illustrating a user system based on an embodiment of the disclosed technology.

Referring to FIG. 13, the user system 5000 includes an application processor 5100, a memory module 5200, a network module 5300, a storage module 5400, and a user interface 5500.

The application processor 5100 may drive components included in the user system 5000, an operating system (OS), a user program, or the like. In some implementations, the application processor 5100 may include controllers for controlling components included in the user system 5000, interfaces, a graphic engine, and the like. The application processor 5100 may be provided as a System-on-Chip (SoC).

The memory module 5200 may operate as a main memory, working memory, buffer memory or cache memory of the user system 5000. The memory module 5200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. In some implementations, the application processor 5100 and the memory module 5200 may be provided as one semiconductor package by being packaged based on a Package on Package (PoP).

The network module 5300 may communicate with external devices. In some implementations, the network module 5300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In some implementations, the network module 5300 may be included in the application processor 5100.

The storage module 5400 may store data. For example, the storage module 5400 may store data received from the application processor 5100. Alternatively, the storage module 5400 may transmit data stored therein to the application processor 5100. In some implementations, the storage module 5400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In some implementations, the storage module 5400 may be provided as a removable drive such as a memory card of the user system 5000 or an external drive.

In some implementations, the storage module 5400 may include a plurality of nonvolatile memory devices, and the plurality of nonvolatile memory devices may operate identically to the memory device described with reference to FIGS. 1 to 9. The storage module 5400 may operate identically to the storage device 1000 described with reference to FIG. 1.

The user interface 5500 may include interfaces for inputting data or commands to the application processor 5100 or outputting data to an external device. In some implementations, the user interface 5500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 5500 may include user output interfaces such as a Liquid Crystal Display (LCD), an Organic Light Emitting Diode (OLED) display device, an Active Matrix OLED (AMOLED) display device, an LED, a speaker, and a monitor.

In some implementations of the disclosed technology, there can be provided an improved garbage collection operation method of a storage device including a limited number of system blocks.

While specific embodiments of the disclosed technology have been described in this patent document, various changes and modifications of the disclosed embodiments and other embodiments may be made based on the disclosure of this patent document.

What is claimed is:

1. A storage device comprising:
 a memory device including a plurality of system blocks for storing system data; and
 a memory controller configured to control the memory device to store cyclic system data that is cyclically provided from a host, in an open system block among the plurality of system blocks, and control the memory device to perform a garbage collection operation on the plurality of system blocks, when a size of data stored in the open system block reaches a predetermined size,
 wherein the cyclic system data includes a plurality of data slices provided from the host at predetermined cycles, and
 wherein the predetermined size is determined based on a size of the cyclic system data provided for a period of time corresponding to a common multiple of the predetermined cycles.

2. The storage device of claim 1, wherein the common multiple is a least common multiple.

3. The storage device of claim 1, wherein the predetermined size includes a size of the cyclic system data provided for a period of time corresponding to a least common multiple of the predetermined cycles and a size allocated to store random system data that is provided from the host in a noncyclical fashion.

4. The storage device of claim 1, wherein the predetermined size is a multiple of the size of the cyclic system data provided from the host for a period of time corresponding to a least common multiple of the predetermined cycles.

5. The storage device of claim 1, wherein the memory controller includes:
 a garbage collection controller configured to determine a victim block of the garbage collection operation, and control the memory device to move valid data stored in the victim block to at least one system block among the plurality of system blocks; and
 an erase number information storage configured to store a number of erase operations performed on the plurality of system blocks.

6. The storage device of claim 5, wherein the garbage collection controller determines a system block that has performed a smallest number of erase operations among the plurality of system blocks as a target block to which the valid data is to be moved, based on the number of erase operation performed on the plurality of system blocks.

7. The storage device of claim 1, wherein the memory controller controls the memory device to store the random system data in a first open system block among the plurality of system blocks, and to store the cyclic system data in a second open system block different from the first open system block, among the plurality of system blocks.

8. The storage device of claim 1, wherein the memory controller controls the memory device to perform a media scan operation on an open system block in which random system data is stored.

9. The storage device of claim 8, wherein the cyclic system data includes at least one of a read count table of a plurality of memory blocks included in the memory device, storage space information of the plurality of system blocks, or fail information indicating whether at least one of the plurality of system blocks has failed an operation, and
wherein the random system data includes security information for security and encryption of a system.

10. A data storage device comprising:
a memory device including a plurality of memory blocks for storing system data; and
a memory controller configured to control the memory device to store first system data that is cyclically provided from a host and second system data that is provided from the host in a noncyclical fashion, in an open memory block among the plurality of memory blocks for storing system data, and control the memory device to perform a garbage collection operation on the plurality of memory blocks at predetermined cycles,
wherein the first system data includes a plurality of data slices provided from the host, and
wherein the predetermined cycles are proportional to a common multiple of cycles of the plurality of data slices.

11. The data storage device of claim 10, wherein the common multiple is a least common multiple.

12. The data storage device of claim 10, wherein the memory controller includes:
a garbage collection controller configured to determine a victim block of the garbage collection operation, and control the memory device to move valid data stored in the victim block to at least one memory block among the plurality of memory blocks for storing system data; and
an erase number information storage configured to store a number of erase operations performed on the plurality of memory blocks.

13. The data storage device of claim 12, wherein the garbage collection controller determines a memory block that has performed a smallest number of erase operations among the plurality of memory blocks as a target block to which the valid data is to be moved, based on the number of erase operation performed on the plurality of memory blocks.

14. The data storage device of claim 10, wherein the first system data includes at least one of a read count table of a plurality of memory blocks included in the memory device, storage space information of the plurality of memory blocks, or fail information indicating whether at least one of the plurality of memory blocks has failed an operation, and
wherein the second system data includes security information for security and encryption of a system.

15. The data storage device of claim 10, wherein the plurality of memory blocks includes at least three memory blocks.

16. The data storage device of claim 10, wherein the memory controller controls the memory device to perform a media scan operation on the open memory block in which the second system data is stored.

17. A method for operating a storage device including a plurality of system blocks, the method comprising:
storing cyclic system data that is cyclically provided from a host and random system data that is provided from the host in a noncyclical fashion, in an open system block among the plurality of system blocks; and
performing a garbage collection operation on the plurality of system blocks, when a size of data stored in the open system block reaches a predetermined size,
wherein the cyclic system data includes a plurality of data slices provided for every predetermined cycle from the host, and
wherein the predetermined size is determined based on a size of the cyclic system data provided for a period of time corresponding to a common multiple of cycles of the plurality of data slices.

18. The method of claim 17, wherein the predetermined size includes a size of the cyclic system data provided from the host for a period of time corresponding to a least common multiple of the cycles of the plurality of data slices and a size allocated to store the random system data.

19. The method of claim 17, wherein the predetermined size is a multiple of the size of the cyclic system data provided from the host for a period of time corresponding to a least common multiple of the cycles of the plurality of data slices.

20. The method of claim 17, further comprising counting a number of erase operations performed on each of the plurality of system blocks,
wherein the garbage collection operation includes determining a system block that has performed a smallest number of erase operations, among the plurality of system blocks, as a target block to which valid data stored in a victim block is to be moved, based on the number of erase operations performed on each of the plurality of system blocks.

* * * * *